US012666234B2

(12) United States Patent
Komiyama

(10) Patent No.: US 12,666,234 B2
(45) Date of Patent: Jun. 23, 2026

(54) VEHICLE-BASED PREDICTIVE DATA TRANSMISSION SYSTEM AND METHOD FOR TRAFFIC STATE ANALYSIS

(71) Applicant: SoftBank Corp., Tokyo (JP)

(72) Inventor: Yosuke Komiyama, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/849,657

(22) PCT Filed: Feb. 20, 2023

(86) PCT No.: PCT/JP2023/005971
§ 371 (c)(1),
(2) Date: Sep. 23, 2024

(87) PCT Pub. No.: WO2023/188994
PCT Pub. Date: Oct. 5, 2023

(65) Prior Publication Data
US 2025/0220399 A1     Jul. 3, 2025

(30) Foreign Application Priority Data

Mar. 28, 2022    (JP) ................................. 2022-052505

(51) Int. Cl.
*H04W 4/44*          (2018.01)
*B60W 50/00*         (2006.01)
(52) U.S. Cl.
CPC .......... *H04W 4/44* (2018.02); *B60W 50/0097* (2013.01)
(58) Field of Classification Search
CPC ............................. H04W 4/44; B60W 50/0097
(Continued)

(56) References Cited

U.S. PATENT DOCUMENTS 6,256,577 B1 *   7/2001   Graunke .......... G08G 1/096861
                                                    701/414
10,824,145 B1 *  11/2020  Konrardy ........... G01C 21/3461
                        (Continued)

FOREIGN PATENT DOCUMENTS

JP          2017-11509          1/2017
JP          2019-75747          5/2019
                        (Continued)

OTHER PUBLICATIONS

International Search Report for PCT/JP2023/005971 and its English translation, dated Mar. 20, 2023, 2 pages.
(Continued)

*Primary Examiner* — Luis A Martinez Borrero
(74) *Attorney, Agent, or Firm* — Casimir Jones, S.C.; Robert A. Goetz

(57)          ABSTRACT

A vehicle (101) includes: a plurality of sensors (S); an acquisition section (11) that acquires detection data from the plurality of sensors (S); a prediction section (12) that uses a trained model (31) to predict a future state of the vehicle (101) on the basis of detection data ($D_1$) and that outputs a prediction result for the future state as prediction data ($D_2$); and a communication section (2) that transmits, to a server 102, usage information which is based on either the detection data ($D_1$) or the prediction data ($D_2$), after transmitting the usage information, the communication section (2) transmitting subsequent usage information on the basis of a determination result indicating whether it is possible to transmit the subsequent usage information.

7 Claims, 9 Drawing Sheets

(58) Field of Classification Search
USPC ........................................................ 701/117
See application file for complete search history.

(56) References Cited

U.S. PATENT DOCUMENTS

| | | | | |
|---|---|---|---|---|
| 11,036,370 B2 * | 6/2021 | Adenwala | ........... | G06F 3/04842 |
| 11,272,421 B2 * | 3/2022 | Iwata | .................... | H04W 40/22 |
| 11,667,301 B2 * | 6/2023 | Misra | .................... | B60W 40/04 |
| | | | | 701/23 |
| 11,733,703 B2 * | 8/2023 | Anthony | ........... | B60W 60/0015 |
| | | | | 701/23 |
| 2006/0167784 A1 * | 7/2006 | Hoffberg | ............... | H04W 4/029 |
| | | | | 705/37 |
| 2007/0208493 A1 * | 9/2007 | Downs | ................. | G08G 1/0104 |
| | | | | 701/117 |
| 2007/0208494 A1 * | 9/2007 | Chapman | ............. | G08G 1/0104 |
| | | | | 701/117 |
| 2007/0208495 A1 * | 9/2007 | Chapman | ............. | G08G 1/0133 |
| | | | | 701/117 |
| 2007/0208496 A1 * | 9/2007 | Downs | ................. | G08G 1/0133 |
| | | | | 701/117 |
| 2008/0046165 A1 * | 2/2008 | Downs | ................. | G08G 1/0104 |
| | | | | 701/117 |
| 2008/0071465 A1 * | 3/2008 | Chapman | ........... | G01C 21/3691 |
| | | | | 701/117 |
| 2008/0201066 A1 * | 8/2008 | Kanazawa | ....... | G08G 1/096783 |
| | | | | 340/933 |
| 2010/0317420 A1 * | 12/2010 | Hoffberg | ............ | G06Q 30/0282 |
| | | | | 463/1 |
| 2011/0106416 A1 * | 5/2011 | Scofield | ............... | G08G 1/0104 |
| | | | | 701/119 |
| 2015/0241880 A1 * | 8/2015 | Kim | .................... | G05D 1/0287 |
| | | | | 701/25 |
| 2016/0225201 A1 * | 8/2016 | Hiroki | .................... | H04L 67/12 |
| 2018/0006739 A1 * | 1/2018 | Kumabe | ............... | H04B 17/18 |
| 2018/0018876 A1 * | 1/2018 | Kumabe | ............... | H04W 4/40 |
| 2018/0197412 A1 * | 7/2018 | Uchiyama | ............. | G08G 1/012 |
| 2020/0180647 A1 * | 6/2020 | Anthony | ............... | B60W 40/04 |
| 2020/0193808 A1 * | 6/2020 | Guan | ................... | G08G 1/0112 |
| 2020/0216084 A1 * | 7/2020 | Balachandran | ...... | G05D 1/0212 |
| 2020/0247432 A1 * | 8/2020 | Misra | .................... | B60W 40/04 |
| 2021/0181739 A1 * | 6/2021 | Chen | ................... | B60W 40/105 |
| 2021/0256846 A1 | 8/2021 | McErlean et al. | | |
| 2022/0081003 A1 * | 3/2022 | Brown | .............. | B60W 60/0011 |
| 2022/0126864 A1 * | 4/2022 | Moustafa | .......... | B60W 60/0013 |
| 2023/0202529 A1 * | 6/2023 | Cui | ................. | B60W 60/00276 |
| | | | | 701/26 |
| 2024/0420566 A1 * | 12/2024 | Kord | ........................ | H04W 4/44 |
| 2025/0166496 A1 * | 5/2025 | Komiyama | ............. | H04W 4/40 |

FOREIGN PATENT DOCUMENTS

| | | | | |
|---|---|---|---|---|
| JP | 2020-9428 | 1/2020 | | |
| JP | 2020-13557 | 1/2020 | | |
| WO | 2018/135605 | 7/2018 | | |
| WO | WO-2018135605 A1 * | 7/2018 | .............. | G06N 5/04 |

OTHER PUBLICATIONS

Written Opinion for PCT/JP2023/005971 and its English translation, dated Mar. 20, 2023, 5 pages.

* cited by examiner

Figure 5:
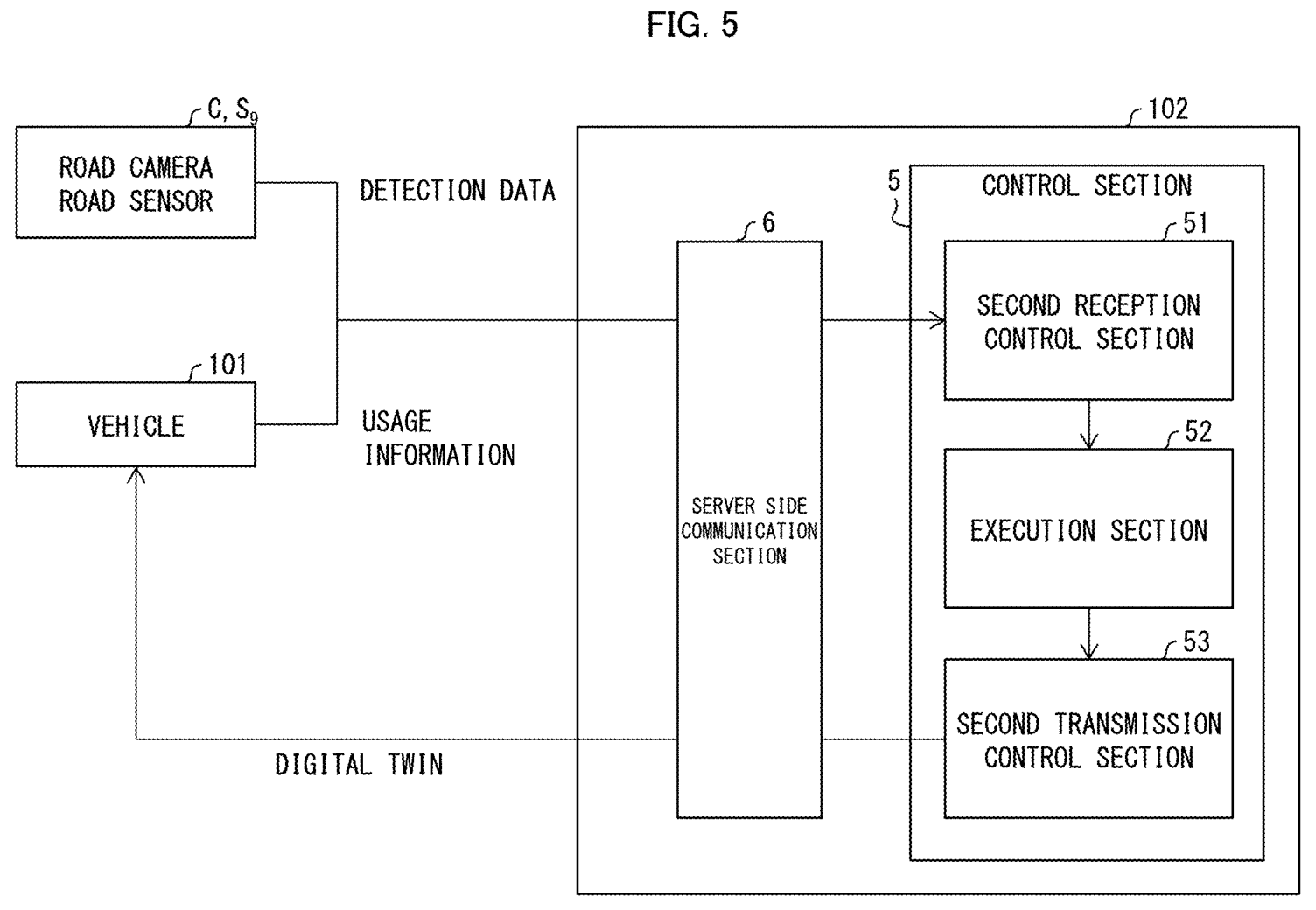

ROAD CAMERA
ROAD SENSOR — C, S9

VEHICLE — 101

DETECTION DATA

USAGE INFORMATION

DIGITAL TWIN

102

SERVER SIDE COMMUNICATION SECTION — 6

CONTROL SECTION

SECOND RECEPTION CONTROL SECTION — 51

EXECUTION SECTION — 52

SECOND TRANSMISSION CONTROL SECTION — 53

VEHICLE-BASED PREDICTIVE DATA TRANSMISSION SYSTEM AND METHOD FOR TRAFFIC STATE ANALYSIS

CROSS-REFERENCE TO RELATED APPLICATIONS

This application claims priority to Japanese Patent Application No. 2022-052505, filed on Mar. 28, 2022, the entire contents of which are incorporated herein by reference.

TECHNICAL FIELD

The present invention relates to a vehicle and a server.

BACKGROUND ART

A technique related to a digital twin system is conventionally known. The digital twin system reproduces a state of a vehicle in a virtual space on the basis of detection data output by various sensors of the vehicle. For example, Patent Literature 1 discloses a method including the steps of: generating a digital twin of a vehicle; receiving digital data that is recorded by a sensor and that describes a state of the vehicle which is present in a real world and behavior of the vehicle which is traveling in the real world; and updating the digital twin of the vehicle on the basis of the digital data so that the digital twin matches the state and the behavior.

CITATION LIST

Patent Literature

[Patent Literature 1]
Japanese Patent Application Publication Tokukai No. 2020-013557

SUMMARY OF INVENTION

Technical Problem

In a digital twin system, as a state of a vehicle is to be reproduced with higher accuracy, a server that generates a virtual space requires more real-time information pertaining to the state of the vehicle. However, according to such a conventional technique as described above, an increase in reproduction accuracy results in an increase in volume of communication traffic between the vehicle and the server. This may make it impossible to transmit sufficient data to the server. In contrast, an attempt to prevent or reduce the volume of communication traffic between the vehicle and the server causes the state of the vehicle to be reproduced in the virtual space with lower accuracy.

Solution to Problem

In order to solve the problem, a vehicle in accordance with an aspect of the present invention includes:
a plurality of sensors;
an acquisition section that acquires detection data from the respective plurality of sensors;
a prediction section that uses a trained model constructed by machine learning to predict a future state of the vehicle on the basis of the detection data and that outputs a prediction result for the future state as prediction data; and a communication section that transmits, to a server, usage information which is based on either the detection data or the prediction data and which is for use in a simulation,
after transmitting the usage information, the communication section transmitting subsequent usage information on the basis of a determination result indicating whether it is possible to transmit the subsequent usage information.

In order to solve the problem, a server in accordance with another aspect of the present invention includes:
a communication section that receives, from a vehicle including a plurality of sensors, an acquisition section which acquires detection data from the respective plurality of sensors, and a prediction section which uses a trained model constructed by machine learning to predict a future state of the vehicle on the basis of the detection data, usage information which is based on either the detection data output by the plurality of sensors or prediction data output by the prediction section and which is necessary for a simulation; and
an execution section that carries out a simulation regarding a traffic condition on the basis of the usage information and traffic data of a traffic participant present around the vehicle,
after receiving the usage information, the communication section receiving subsequent usage information which the vehicle has transmitted in accordance with a determination result that the subsequent usage information is to be transmitted.

BRIEF DESCRIPTION OF DRAWINGS

FIG. 2 is a block diagram illustrating a functional configuration of the vehicle of the digital twin system.
FIG. 5 is a block diagram illustrating a functional configuration of the server in accordance with Embodiment 1.
FIG. 8 is a block diagram illustrating a functional configuration of a server in accordance with Embodiment 2 of an aspect of the present invention.

DESCRIPTION OF EMBODIMENTS

Embodiment 1

Figure 1:
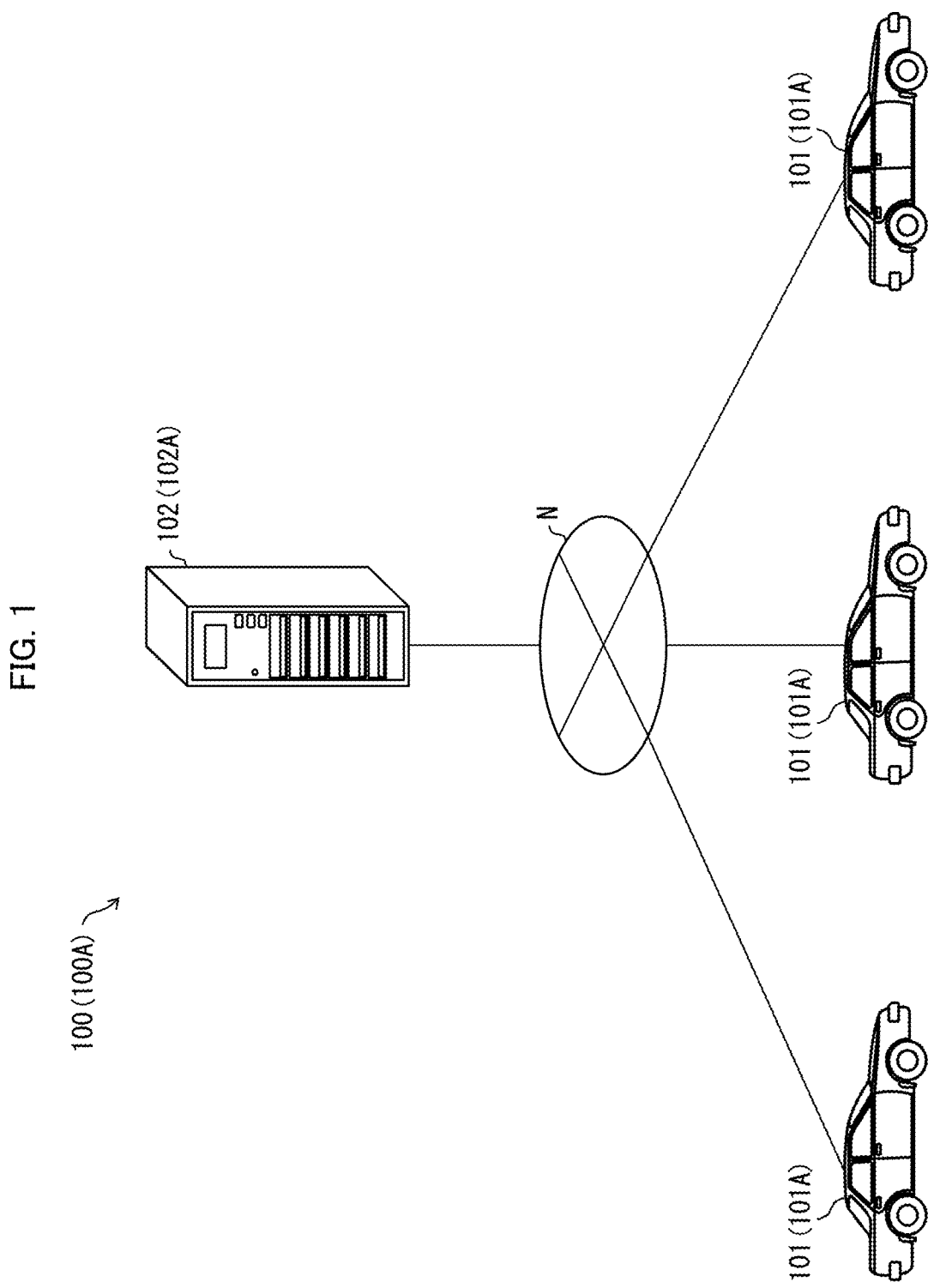
FIG. 1 is a block diagram illustrating a digital twin system constituted by a vehicle and a server in accordance with Embodiments 1 and 2 of an aspect of the present invention.
Figure 2:
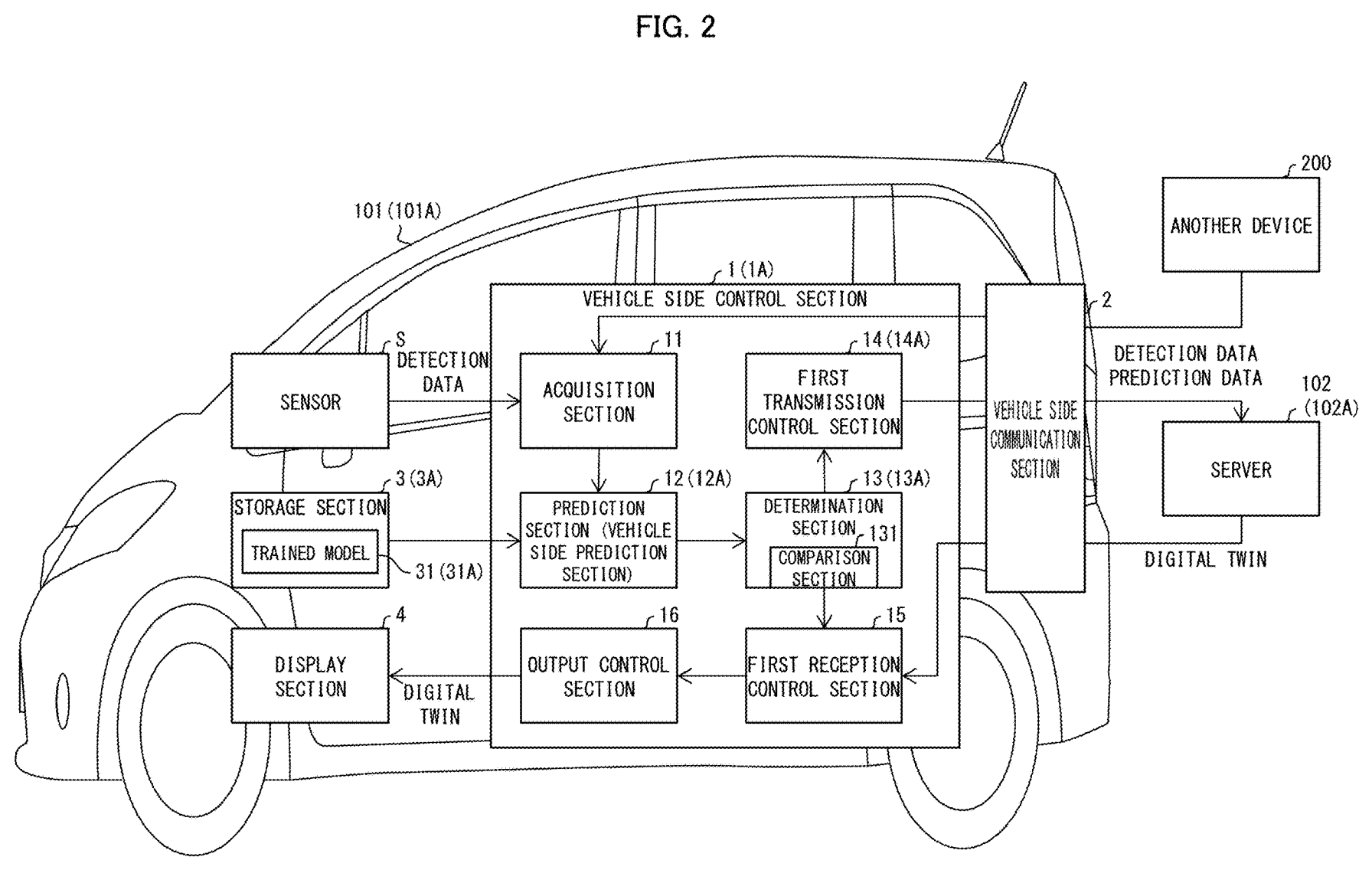
Figure 3:
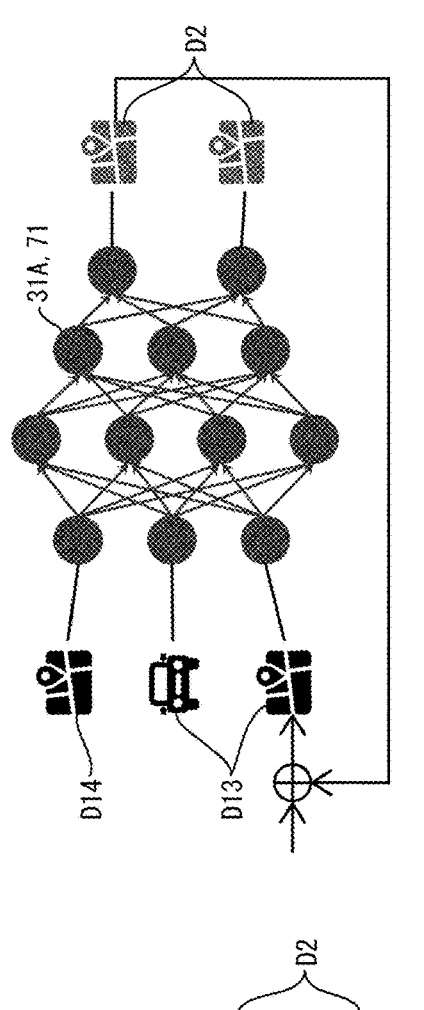
FIG. 3 is a diagram illustrating a trained model used by the digital twin system for prediction.
Figure 3:
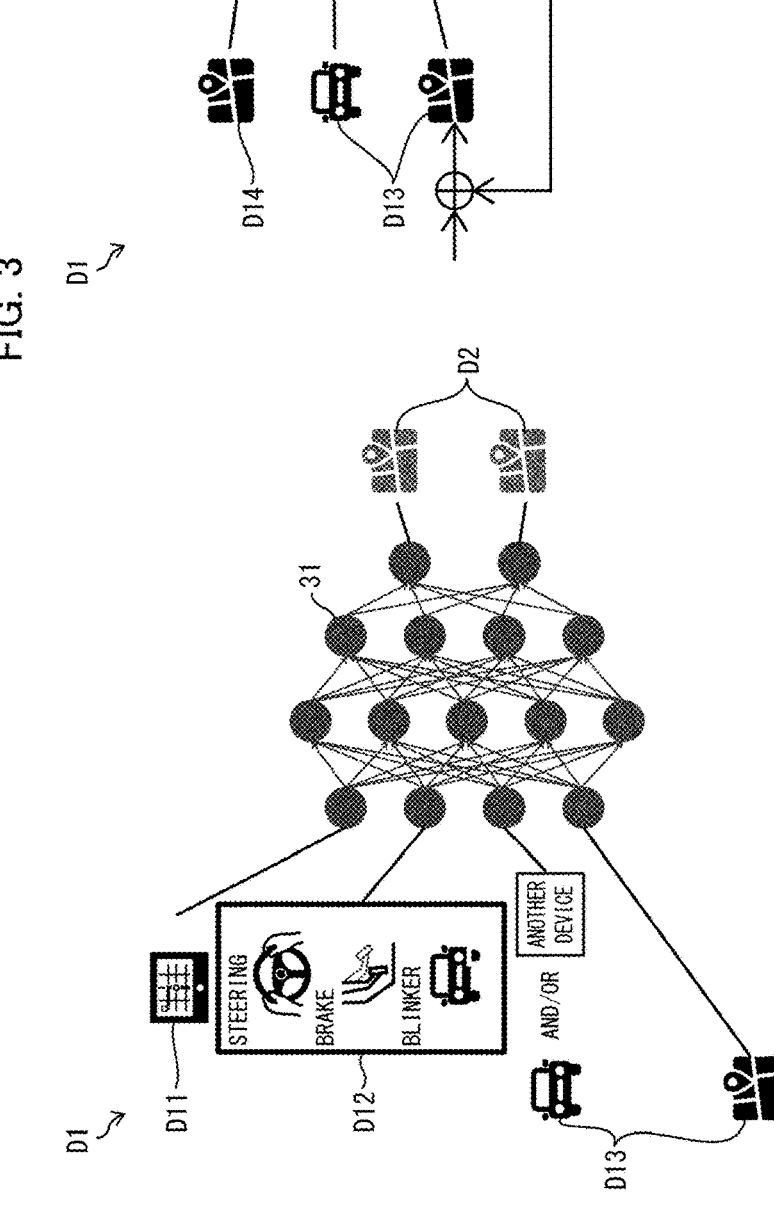
Figure 4:
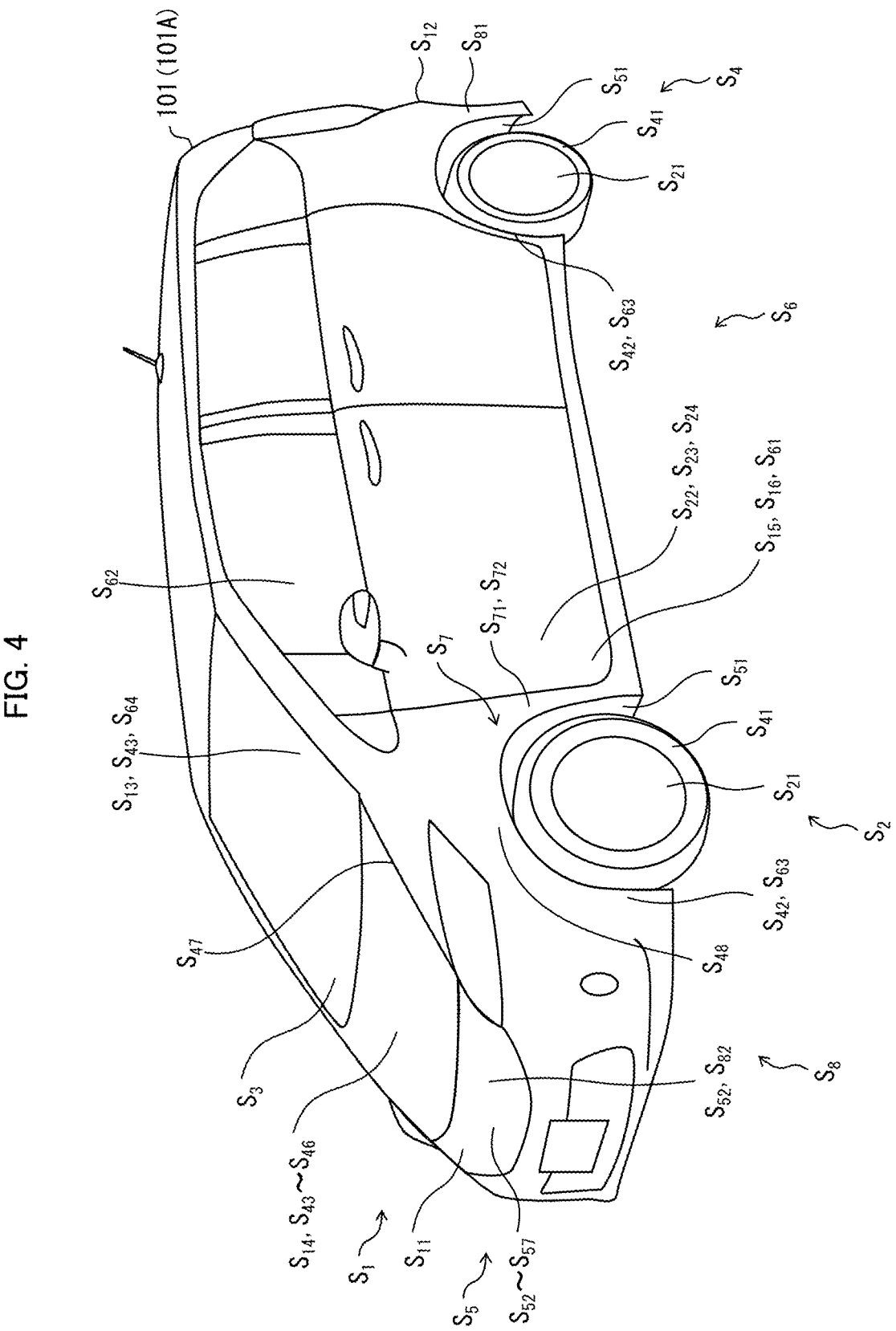
FIG. 4 is a perspective view illustrating the vehicle and a sensor of the vehicle.

First, the following description will discuss Embodiment 1 of the present invention in detail. FIG. 1 is a block diagram illustrating a digital twin system 100. FIG. 2 is a block diagram illustrating a functional configuration of a vehicle 101. FIG. 3 is a diagram illustrating a trained model used by the digital twin system 100 for prediction. FIG. 4 is a perspective view illustrating the vehicle 101 and a sensor of the vehicle 101. FIG. 5 is a block diagram illustrating a functional configuration of a server 102. Note that reference numerals in parentheses in the drawings indicate reference numerals in Embodiment 2 described later.

Configuration of Digital Twin System 100

The digital twin system 100 reproduces, in a virtual space, a digital twin indicating a state of the vehicle 101. The digital twin system 100 includes a plurality of vehicles 101 and the server 102 as illustrated in FIG. 1. These are connected to each other via a communication network N.

Vehicle 101

The vehicle 101 includes a plurality of types of sensors S, a vehicle side control section 1, a vehicle side communication section 2, a storage section 3, and a display section 4 as illustrated in FIG. 2.

Vehicle Side Communication Section 2

The vehicle side communication section 2 transmits and receives, for example, various data and various signals in a wired or wireless manner with another device 200 (e.g., the server 102 described later, a terminal device possessed by or attached to a traffic participant other than the vehicle 101 (a pedestrian or a person on a bicycle), a drone, a road camera C installed on the road, a road sensor $S_9$ installed on the road, etc.). The vehicle side communication section 2 in accordance with the present embodiment is constituted by a communication module.

Storage Section 3

The storage section 3 stores a trained model 31. The trained model 31 in accordance with the present embodiment is configured to generate prediction data $D_2$ on the basis of a relatively large number of types of detection data $D_1$ (as compared with a trained model 31A of Embodiment 2 described later). The detection data $D_1$ includes, as illustrated in a left-hand part of FIG. 3, prior information $D_{11}$ that is set before traveling, event information $D_{12}$ that is generated in response to occurrence of an event, and update information $D_{13}$ that is periodically updated. The prior information $D_{11}$ includes, for example, route information of a navigation system. The event information $D_{12}$ includes, for example, braking information pertaining to braking of the vehicle 101. The braking information includes, for example, steering information indicating that a steering wheel has been operated, brake information indicating that a brake has been applied, and blinker information indicating that a blinker has been turned on. The update information $D_{13}$ includes, for example, a position of the vehicle 101, a speed of the vehicle 101, and acceleration/deceleration of the vehicle 101. The update information $D_{13}$ may be from the sensors S of the vehicle 101 or may be from the another device 200. The prediction data $D_2$ includes, for example, future traffic information (e.g., the position, etc.) of the vehicle 101.

The trained model 31 in accordance with the present embodiment is constructed by machine learning (e.g., deep learning) in which training data is a set of (i) the detection data $D_1$ obtained in the past and (ii) traffic information obtained when the detection data $D_1$ is obtained or in a situation similar to that when the detection data $D_1$ is obtained. The trained model 31 in accordance with the present embodiment can use such a large number of detection data $D_1$ to comparatively accurately predict the state of the vehicle 101 in a relatively distant future (as compared with the trained model 31A of Embodiment 2). Note that the trained model 31 may be configured to generate other prediction data $D_2$ different from the prediction data $D_2$ and serving as a candidate.

Display Section 4

The display section 4 is provided at a position at which a driver of the vehicle 101 can visually recognize the display section 4. Further, the display section 4 displays a screen based on a signal from the vehicle side control section 1.

Vehicle Side Control Section 1

The vehicle side control section 1 includes an acquisition section 11, a prediction section 12, a determination section 13, a first transmission control section 14, a first reception control section 15, and an output control section 16 as illustrated in FIG. 2.

Acquisition Section 11

The acquisition section 11 in accordance with the present embodiment acquires the detection data $D_1$ from the respective plurality of types of sensors S. Further, the acquisition section 11 in accordance with the present embodiment acquires the detection data $D_1$ from the respective sensors S via an input IF (not illustrated) to which the sensors S are connected. Furthermore, the acquisition section 11 in accordance with the present embodiment acquires the detection data $D_1$ from the another device 200. The acquisition section 11 in accordance with the present embodiment acquires the detection data $D_1$ from the another device 200 via the vehicle side communication section 2. Moreover, the acquisition section 11 in accordance with the present embodiment repeatedly acquires various types of the detection data $D_1$ every time a certain time period (e.g., 100 msec) has elapsed. The certain time period can be set to any length.

The sensors S of the vehicle 101 include, for example, at least one selected from the group consisting of a position (distance/angle) sensor $S_1$, a speed sensor $S_2$, an acceleration sensor $S_3$, a pressure sensor $S_4$, a temperature sensor $S_5$, a force (torque) sensor $S_6$, a flowmeter $S_7$, and a gas sensor $S_8$ as illustrated in FIG. 4.

The position (distance/angle) sensor $S_1$ includes at least one selected from the group consisting of a sensor $S_{11}$ that detects a distance from an object present in the front, a sensor $S_{12}$ that detects a distance from an object present in the rear, a sensor $S_{13}$ that detects a rotation angle of a steering wheel, a sensor $S_{14}$ that detects an inclination angle of a throttle valve, a sensor $S_{15}$ that detects an inclination angle of an accelerator pedal, and a sensor $S_{16}$ that detects an inclination angle of a brake pedal.

The speed sensor $S_2$ includes at least one selected from the group consisting of a sensor $S_{21}$ that detects a rotation speed of a wheel, a sensor $S_{22}$ that detects a speed of a crankshaft, a sensor $S_{23}$ that detects a speed of a camshaft, and a sensor $S_{24}$ that detects a jet velocity of a jet pump in a diesel engine.

The acceleration sensor $S_3$ detects acceleration (impact) acting on a vehicle body.

The pressure sensor $S_4$ includes at least one selected from the group consisting of a sensor $S_{41}$ that detects a tire pressure, a sensor $S_{42}$ that detects a brake pressure, a sensor $S_{43}$ that detects a hydraulic reservoir pressure in power steering, a sensor $S_{44}$ that detects a suction pressure, a sensor $S_{45}$ that detects a charging pressure, a sensor $S_{46}$ that detects a fuel pressure, a sensor $S_{47}$ that detects a refrigerant pressure in air conditioning, and a sensor $S_{48}$ that detects a modulation pressure in an automatic transmission.

The temperature sensor $S_5$ includes at least one selected from the group consisting of a sensor $S_{51}$ that detects a tire temperature, a sensor $S_{52}$ that detects an air supply temperature, a sensor $S_{53}$ that detects an ambient temperature, a sensor $S_{54}$ that detects an internal temperature, a sensor $S_{55}$ that detects an evaporator temperature in air conditioning, a sensor $S_{56}$ that detects a coolant temperature, and a sensor $S_{57}$ that detects an engine oil temperature.

The force (torque) sensor $S_6$ includes at least one selected from the group consisting of a sensor $S_{61}$ that detects a pedaling force, a sensor $S_{62}$ that detects a body weight of an occupant, a sensor $S_{63}$ that detects torque acting on a drive shaft, and a sensor $S_{64}$ that detects torque acting on a steering wheel.

The flowmeter $S_7$ includes at least one selected from the group consisting of a sensor $S_{71}$ that detects a flow rate of fuel and an amount of the fuel supplied to an engine and a sensor $S_{72}$ that detects an amount of air sucked by the engine.

The gas sensor $S_8$ includes at least one selected from the group consisting of a sensor $S_{81}$ that detects a composition of exhaust gas and a sensor $S_{82}$ that detects a hazardous substance contained in supplied air.

Note that the above-listed various sensors S are publicly known as disclosed in, for example, the following Web pages:

> Vehicle sensors functions and types https://innovationdis-coveries.space/vehicle-sensors-functions-and-types/
> Automotive sensors: the design engineer's guide https://www.avnet.com/wps/portal/abacus/solutions/m arkets/automotive-and-transportation/automotive/communi-cations-and-connectivity/automotive-sensors/

Note that the acquisition section 11 may be configured to acquire the detection data $D_1$ from the respective plurality of vehicles 101. The acquisition section 11 may alternatively be configured to acquire, from the vehicle 101 via a storage device (not illustrated), the detection data $D_1$ (once stored in the storage device). The acquisition section 11 may alternatively be configured to acquire the detection data $D_1$ via a recording medium or the like instead of the vehicle side communication section 2. The acquisition section 11 may alternatively be configured to acquire the detection data $D_1$ from the another device 200 described earlier, for example, the traffic participant other than the vehicle 101, the drone, etc. The acquisition section 11 may alternatively be configured to acquire the detection data $D_1$ via the vehicle side communication section 2 from at least one selected from the group consisting of the road camera C and the road sensor $S_9$. The acquisition section 11 may alternatively be configured to acquire the detection data $D_1$ that is route information set in a navigation system of the vehicle 101 or the terminal device. The acquisition section 11 may alternatively be configured to acquire the detection data $D_1$ that is an image(s) captured by an event data recorder and/or a rear view camera of the vehicle 101. The acquisition section 11 may alternatively be configured to acquire the detection data $D_1$ that is information (such as drowsiness of a driver) determined by the vehicle 101 on the basis of the detection data $D_1$.

Prediction Section 12

The prediction section 12 predicts a future state of the vehicle 101 on the basis of the detection data $D_1$ and outputs a prediction result for the future state as the prediction data $D_2$. The future refers to, for example, a time after a first certain time period from a time at which the detection data $D_1$ is acquired. The first certain time period can be set to any length (e.g., 500 msec) that exceeds a cycle in which the detection data $D_1$ is acquired by the acquisition section 11. The prediction section 12 uses the trained model 31 stored in the storage section 3 to predict the future. The prediction data $D_2$ includes, for example, a future position of the vehicle 101, etc. As described earlier, the acquisition section 11 repeatedly acquires the detection data $D_1$. Thus, the prediction section 12 in accordance with the present embodiment repeatedly predicts the future state of the vehicle 101 (outputs the prediction data $D_2$). Further, as described earlier, the trained model 31 stored in the storage section 3 in accordance with the present embodiment has a relatively large number (relatively many types) of data to be input. Thus, the prediction section 12 in accordance with the present embodiment outputs the prediction data $D_2$ indicating a relatively distant future state of the vehicle 101. Note that the prediction section 12 may be configured to output, instead of the prediction data $D_2$ indicating a state at a certain moment in the future, the prediction data $D_2$ having a temporal width. The prediction section 12 may alternatively be configured to output, as the prediction data $D_2$ indicating the state at a certain moment in the future, the prediction data $D_2$ having a spatio-temporal width.

Determination Section 13

The determination section 13 determines whether it is possible to transmit usage information. The usage information is information for use by the server 102 described later to carry out a simulation. The usage information is information based on either the detection data $D_1$ or the prediction data $D_2$. The determination section 13 in accordance with the present embodiment determines, as whether it is possible to transmit information, whether a predicted future (time after the first certain time period) is reached. The expression "the future is reached" may indicate that a time immediately before (e.g., several seconds before) the future has been reached, or may indicate that the future has been actually reached. The vehicle 101 that includes such a determination section 13 enables quick determination. Further, the determination section 13 in accordance with the present embodiment repeatedly carries out such determination. Note that the determination section 13 may be constituted by a timer. Further, in a case where the server 102 described later can use information from a device different from the vehicle 101 to specify the usage information, the determination section 13 may be configured to determine, in response to an instruction from the server 102, whether it is possible to transmit the usage information. Examples of a case where the information from the device different from the vehicle 101 can be used to specify the usage information include a case where the server 102 can directly acquire the detection data $D_1$ such as position information, a speed, etc. of the vehicle 101 from the road camera C, the road sensor $S_9$, etc.

First Transmission Control Section 14

The first transmission control section 14 controls the vehicle side communication section 2 on the basis of a determination result from the determination section 13. With this, in a case where the determination section 13 determines that the usage information is to be transmitted, the vehicle side communication section 2 wirelessly transmits the usage information to the server 102. As described earlier, the vehicle side control section 1 in accordance with the present embodiment includes the prediction section 12 and outputs the prediction data $D_2$. Thus, the vehicle side communication section 2 in accordance with the present embodiment wirelessly transmits, to the server 102, the prediction data $D_2$ as the usage information. This makes it possible to save time and effort required for prediction of the state of the vehicle 101 by the server 102. As a result, the server 102 can easily generate a digital twin.

Further, as described earlier, the determination section 13 in accordance with the present embodiment repeatedly carries out determination. Thus, after transmitting the usage information, the vehicle side communication section 2 in accordance with the present embodiment wirelessly transmits subsequent usage information on the basis of a determination result indicating whether it is possible to transmit the subsequent usage information.

Furthermore, as described earlier, the determination section 13 in accordance with the present embodiment determines, as whether it is possible to transmit information, whether the predicted future is reached. Thus, in a case where the determination section 13 determines that the predicted future is reached, the vehicle side communication section 2 in accordance with the present embodiment wirelessly transmits the usage information to the server 102. This makes it unnecessary, during a period until the predicted future is reached, to transmit data to the server 102, so that a volume of communication traffic between the vehicle 101 and the server 102 can be reduced. Note that, in a case where the server 102 can directly acquire the detection data $D_1$ from the road camera C, the road sensor $S_9$, etc., the first transmission control section 14 may control the vehicle side communication section 2 so as to stop transmission of the usage information.

First Reception Control Section 15

The first reception control section 15 controls the vehicle side communication section 2 so as to receive a simulation result (digital twin) from the server 102.

Output Control Section 16

The output control section 16 controls the display section 4 so as to display the simulation result received from the server 102. The output control section 16 may control a speaker (not illustrated) so as to output a voice.

Others

Note that the vehicle side control section 1 may include a comparison section 131 (see Embodiment 2 described later) that compares the future state of the vehicle 101 which future state is based on the prediction data $D_2$ with a current state of the vehicle 101 which current state is based on the detection data $D_1$ immediately after acquisition of the detection data $D_1$. In this case, the determination section 13 may be configured to determine, as whether it is possible to transmit the usage information, whether an error which is not less than a threshold set in advance has occurred between the future state and the current state. Further, in this case, the vehicle side communication section 2 may be configured to, in a case where the determination section 13 determines that the error which is not less than the threshold has occurred, wirelessly transmit, to the server 102, new prediction data $D_2$ output by the prediction section 12.

Furthermore, in this case, the first transmission control section 14 may be configured to control the vehicle side communication 2 section so that, while the determination section 13 is determining that an error which has occurred between the future state and the current state is less than the threshold, the vehicle side communication section 2 does not transmit a prediction result for the future state of the vehicle 101 to the server 102 even in a case where the prediction section 12 predicts the future state of the vehicle 101. Alternatively, the prediction section 12 may be configured such that, while the determination section 13 is determining that the error which has occurred between the future state and the current state is less than the threshold, the prediction section 12 does not predict the future state of the vehicle 101.

During a period until the error reaches the threshold or more, the usage information (prediction data $D_2$) is not transmitted to the server 102. Further, unless the vehicle 101 carries out quite extreme operation, it takes a certain amount of time for the error which occurs between the future state and the current state to reach the threshold or more. Thus, the above-described configuration makes it possible to reduce the volume of communication traffic between the vehicle 101 and the server 102 as compared with a conventional case where transmission of usage information is periodically repeated.

Further, the vehicle 101 may include an operation control section instead of the display section 4 and the output control section 16 or in addition to the display section 4 and the output control section 16. The operation control section automatically controls, on the basis of the simulation result received from the server 102, at least some of operations carried out by the vehicle 101. This allows the traffic information to be more quickly provided to the operation control section. Thus, the operation control section can carry out operation with higher safety.

Server 102

The server 102 includes a server side control section 5 and a server side communication section 6 as illustrated in FIG. 5.

Server Side Communication Section

The server side communication section 6 transmits and receives, for example, various data and various signals in a wired or wireless manner with another device (e.g., the vehicle 101, the terminal device possessed by the traffic participant other than the vehicle 101, the drone, the road camera C, the road sensor $S_9$, etc.). The server side communication section 6 in accordance with the present embodiment is constituted by a communication module.

Server Side Control Section

The server side control section 5 includes a second reception control section 51, an execution section 52, and a second transmission control section 53.

Second Reception Control Section 51

The second reception control section 51 controls the server side communication section 6 so that the server side communication section 6 receives the usage information from the vehicle 101. As described earlier, after wirelessly transmitting the usage information, the vehicle side communication section 2 of the vehicle 101 in accordance with the present embodiment wirelessly transmits subsequent usage information in accordance with a determination result that the subsequent usage information is to be transmitted. Thus, after receiving the usage information, the second reception control section 51 controls the vehicle side communication section 2 so as to receive the subsequent usage information which the vehicle has transmitted in accordance with a determination result that the subsequent usage information is to be transmitted. Thus, after receiving the usage information, the server side communication section 6 receives the subsequent usage information.

Further, as described earlier, the vehicle side communication section 2 of the vehicle 101 in accordance with the present embodiment is configured to wirelessly transmit the prediction data $D_2$ as the usage information. Thus, the server side communication section 6 receives the prediction data $D_2$ as the usage information.

Execution Section 52

The execution section 52 carries out a simulation regarding a traffic condition on the basis of the usage information and traffic data of the traffic participant present around the vehicle 101. The traffic data is, for example, various data that have been transmitted from the terminal device possessed by or attached to the traffic participant, the drone, the road camera C installed on the road, the road sensor $S_9$ installed on the road, etc. As described earlier, the second reception control section 51 in accordance with the present embodiment receives the prediction data $D_2$ as the usage information. Thus, the execution section 52 in accordance with the present embodiment carries out the simulation regarding the traffic condition on the basis of the prediction data $D_2$ and the traffic data. As a result, the execution section 52 generates, as a simulation result, a digital twin indicating the future state of the vehicle 101. This makes it possible to carry out the simulation without generation of the prediction data $D_2$ by the server 102. As a result, it is possible to reduce a burden on the server 102. Note that the simulation result may include not only information pertaining to the vehicle 101 but also information pertaining to an environment surrounding the vehicle 101 (for example, information pertaining to another traffic participant, etc.). Further, the execution section 52 that can directly acquire detection data $D_1$ from a device different from the vehicle 101 may be configured to carry out the simulation on the basis of the detection data $D_1$ instead of the usage information of the vehicle 101.

Second Transmission Control Section 53

The second transmission control section 53 controls the server side communication section 6 in a case where the execution section 52 carries out the simulation. This allows the server side communication section 6 to wirelessly transmit, to at least one selected from the group consisting of the vehicle 101 and the terminal device possessed by the traffic participant, a result of the simulation carried out by the execution section 52. This allows an occupant (traffic participant) of the vehicle 101 to be aware, by seeing the simulation result displayed on the display section 4 (display section of the terminal device), in what situation the occupant may be placed in the future. As a result, the occupant (traffic participant) of the vehicle 101 can drive (move) very safely with attention paid to a situation of which the occupant has been made aware. Further, such a configuration allows urban and human residential areas to be safe. This makes it possible to contribute to achievement of Goal 11 "Make cities and human settlements inclusive, safe, resilient and sustainable." of Sustainable Development Goals (SDGs).

Another Configuration of Digital Twin System 100

The digital twin system 100 may include at least one selected from the group consisting of: a vehicle that has a function to output the usage information but does not have a function to acquire the simulation result; and a vehicle that does not have the function to output the usage information but has the function to acquire the simulation result.

Operation by DIGITAL TWIN SYSTEM 100

Figure 6:
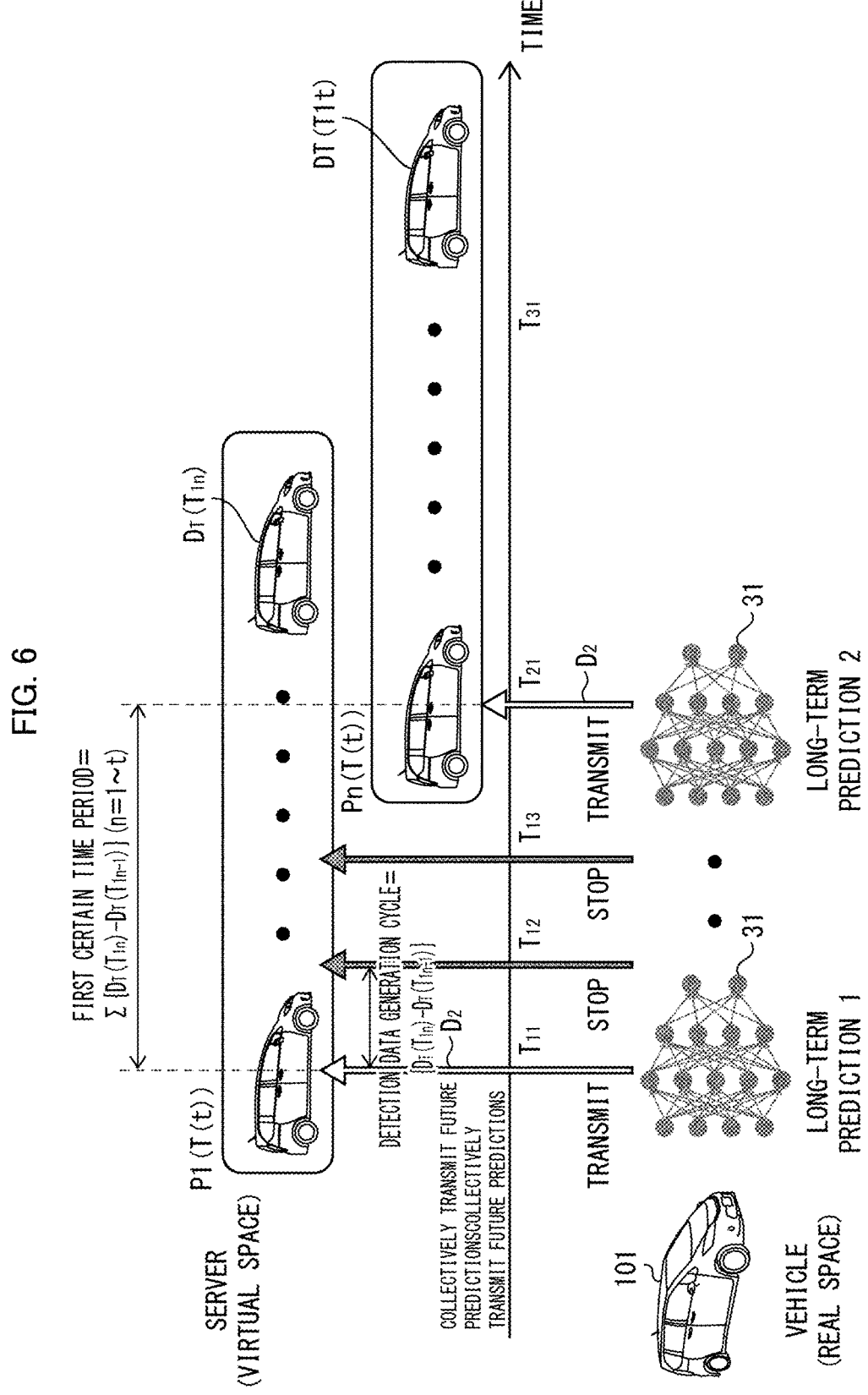
FIG. 6 is a timing diagram illustrating an operation by a digital twin system in accordance with Embodiment 1.

In a case where a certain event occurs in the vehicle 101 constituting the digital twin system 100, as illustrated in FIG. 6, the vehicle 101 uses the trained model 31 to output the prediction data $D_2$ indicating the state of the vehicle 101 in a future $(T_{1t})$. Examples of the certain event include setting of the route information in the navigation system and generation of the detection data $D_1$ by the various sensors S of the vehicle 101. The vehicle 101 that has generated the detection data $D_1$ uses, as a cycle, a time difference $D_T$ $(T_{1n})-D_T(T_{1n-1})$ (n=1 to t) identical to a cycle in which the detection data $D_1$ has been generated to repeatedly predict a future $D_T(T_{1n})$ of the vehicle 101 at each time T until a time $T_{1t}$ is reached. The vehicle 101 collectively outputs, as the prediction data $D_2$, the future $D_T(T_{1n})$ of the vehicle 101 at each time from $T_{11}$ to $T_{1t}$ which future has been obtained by prediction, and immediately transmits the prediction data $D_2$ to the server 102 $(T_{11})$. The first certain time period described earlier is a sum of time differences $D_T(T_{1n})-D_T(T_{1n-1})$ in the prediction data $D_2$. A conventional vehicle repeats communication with the server 102 also thereafter $(T_{12}, T_{13}, \ldots)$, whereas the vehicle 101 does not transmit the prediction data $D_2$ (though carrying out future prediction itself) until it is determined that the predicted future $(T_{1t})$ is reached. Note that the first certain time period can also be considered to be a cycle in which the prediction data $D_2$ is output, and is longer than both a cycle in which the detection data $D_1$ is generated and a cycle in which the trained model 31 carries out prediction.

The server 102 that has received the prediction data $D_2$ carries out a simulation on the basis of the received prediction data $D_2$ and generates a digital twin indicating the state of the vehicle 101 in the future (at the time $T_{1t}$).

In a case where the future $(T_{1t})$ predicted last time (here, a time $(T_{21})$ immediately before the future $(T_{1t})$ predicted last time) is reached, the vehicle 101 uses the trained model 31 again to output the prediction data $D_2$ indicating the state of the vehicle 101 in a future $(T_{2t})$. The vehicle 101 immediately transmits the output prediction data $D_2$ to the server 102 $(T_{21})$. The vehicle 101 does not transmit the prediction data $D_2$ until it is determined that the predicted future $(T_{2t})$ is reached.

Figure 7:
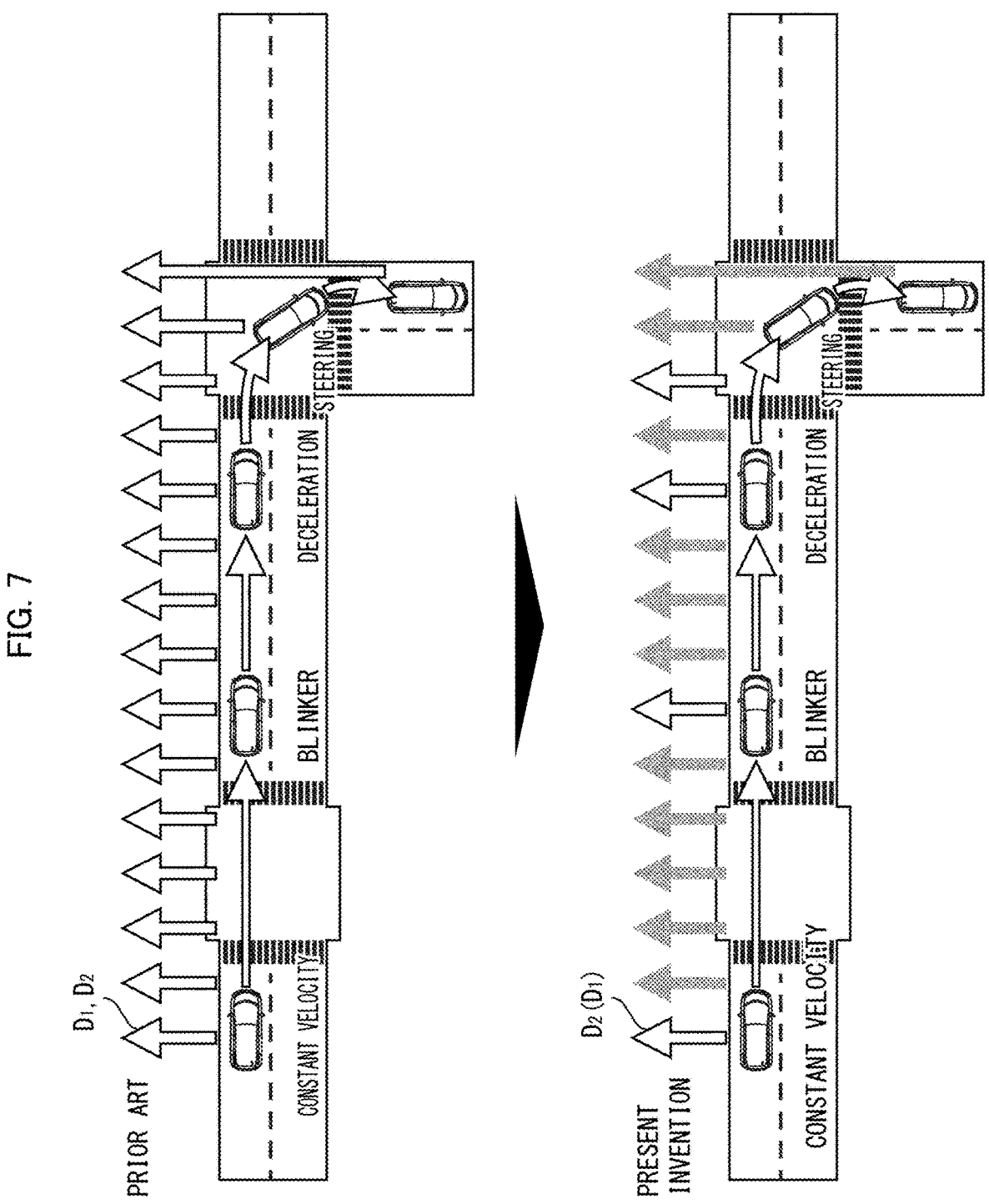
FIG. 7 is a view describing some of effects of the present invention.

The server 102 that has received the prediction data $D_2$ carries out a simulation on the basis of the received prediction data $D_2$ and generates a digital twin indicating the state of the vehicle 101 in the future (at the time $T_{2t}$). Thereafter, the vehicle 101 and the server 102 repeat the operation as described earlier every time the future $(T_{31} \ldots)$ predicted last time is reached. As a result, a conventional vehicle is configured to periodically transmit data as illustrated in an upper part of FIG. 7, whereas the vehicle 101 in accordance with the present embodiment transmits the usage information at longer intervals as compared with the conventional vehicle as illustrated in a lower part of FIG. 7.

Effect

According to the vehicle 101 in accordance with the present embodiment described above, since the future state of the future vehicle 101 is predicted on the vehicle 101 side, it is possible to predict a more distant future with higher accuracy on the basis of a sufficient amount of the detection data $D_1$ without attention paid to a volume of communication traffic. On the server 102 side, it is possible to carry out a highly accurate simulation merely by receiving the prediction data $D_2$. The prediction data $D_2$ has a data volume that is smaller than a total volume of all the detection data $D_1$ required to generate the prediction data $D_2$. This allows the server 102 to carry out a simulation with a smaller data volume than a conventional server. Further, since the prediction data $D_2$ received by the server 102 has high accuracy, the server 102 can reproduce a digital twin with high accuracy. As a result, in the digital twin system 100 including the vehicle 101 and the server 102 that generates a digital twin of the vehicle 101, a reduction in volume of communication traffic between the vehicle 101 and the server 102 can be achieved without a decrease in accuracy of the digital twin.

Embodiment 2

Figure 8:
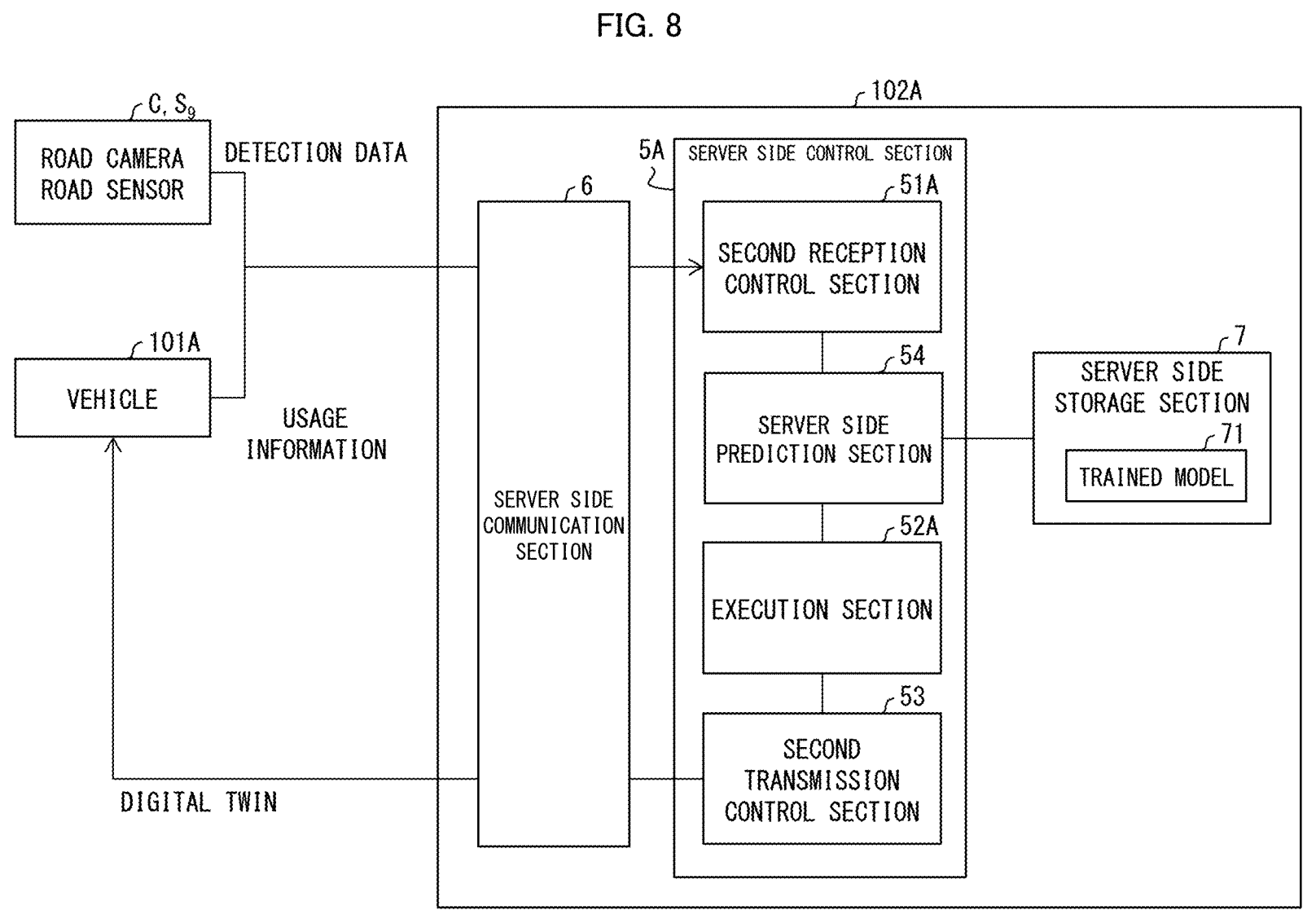

Next, the following description will discuss Embodiment 2 of the present invention. FIG. 8 is a block diagram illustrating a functional configuration of a server 102A. Note that for convenience, members having functions identical to those of the respective members described in Embodiment 1 are given respective identical reference numerals, and a description of those members is omitted.

Configuration of Digital Twin System 100A

The digital twin system 100 in accordance with Embodiment 1 is configured such that the vehicle 101 predicts the future state of the vehicle, and the server 102 receives the prediction data $D_2$ from the vehicle 101 and carries out a simulation. In contrast, a digital twin system 100A in accordance with the present embodiment is configured such that both a vehicle 101A and a server 102A predict a future state of the vehicle 101A. The digital twin system 100A in accordance with the present embodiment includes a plurality of vehicles 101A and the server 102A as illustrated in FIG. 1. These are connected to each other via a communication network N.

Vehicle 101A

The vehicle 101A in accordance with the present embodiment includes not only a plurality of types of sensors S, a vehicle side communication section 2, and a display section 4 but also a vehicle side control section 1A and a vehicle side storage section 3A as illustrated in FIG. 2.

Vehicle Side Storage Section 3A

The vehicle side storage section 3A stores a trained model 31A. The trained model 31A in accordance with the present embodiment is configured to generate prediction data $D_2$ on the basis of some of detection data $D_1$, i.e., a relatively small number of types of the detection data $D_1$ (as compared with the trained model 31 of Embodiment 1 described above). Some of the detection data $D_1$ include update information $D_{13}$ and map information $D_{14}$ as illustrated in a right-hand part of FIG. 3.

The trained model 31A in accordance with the present embodiment is constructed by machine learning (e.g., deep learning) in which training data is a set of (i) the detection data $D_1$ obtained in the past and (ii) traffic information obtained when the detection data $D_1$ is obtained or in a situation similar to that when the detection data $D_1$ is obtained. The trained model 31A in accordance with the present embodiment thus uses, as input, a smaller number of data than in Embodiment 1 to predict a state of the vehicle 101A in a relatively near future (as compared with the trained model 31 of Embodiment 1). The relatively near future refers to, for example, a time after a second certain time period from a time at which the detection data $D_1$ is acquired. The second certain time period can be set to any length (e.g., 300 msec) that exceeds a cycle in which the detection data $D_1$ is generated but does not exceed the first certain time period. Further, the state (prediction data $D_2$) of the vehicle 101A in a near future which state is output by the trained model 31A in accordance with the present embodiment serves as a predicted value of the detection data $D_1$ after the second certain time period, the predicted value corresponding to the input detection data $D_1$. Note that the trained model 31A may be configured to generate other prediction data $D_2$ different from the prediction data $D_2$ and serving as a candidate.

Vehicle Side Control Section 1A

The vehicle side control section 1A includes not only an acquisition section 11, a first reception control section 15, and an output control section 16 but also a vehicle side prediction section 12A, a determination section 13A, and a first transmission control section 14A as illustrated in FIG. 2.

Vehicle Side Prediction Section 12A

The vehicle side prediction section 12A in accordance with the present embodiment uses the trained model 31A to predict a future state of the vehicle 101A on the basis of some of the detection data $D_1$ and outputs a prediction result for the future state as the prediction data $D_2$. The prediction data $D_2$ includes, for example, a future position of the vehicle 101A, etc. The vehicle side prediction section 12A uses the trained model 31A stored in the vehicle side storage section 3A to predict a future. As described earlier, the trained model 31A stored in the vehicle side storage section 3A in accordance with the present embodiment uses, as input, a smaller number (fewer types) of the detection data $D_1$ than the trained model 31 in accordance with Embodiment 1. This causes the vehicle side prediction section 12A in accordance with the present embodiment to predict the state of the vehicle 101A in the relatively near future (after the second certain time period from the time at which the detection data $D_1$ is acquired). At a timing at which the detection data $D_1$ is transmitted to the server side prediction section 54 (for the first time and in a case where an error which is not less than a threshold has occurred), the vehicle side prediction section 12A in accordance with the present embodiment carries out prediction by inputting, into the trained model 31A, the detection data $D_1$ identical to that to be transmitted to the server 102A. In contrast, at a timing different from the above timing (in a case where the error which is not less than the threshold has not occurred), the vehicle side prediction section 12A inputs, into the trained model 31A, the prediction data $D_2$ that the vehicle side prediction section 12A predicted last time. That is, the vehicle side prediction section 12A in accordance with the present embodiment repeats prediction in a certain cycle. Hereinafter, one of the repeatedly output prediction data $D_2$ which one is input into the trained model 31A is referred to as predictive detection data $D_3$.

Determination Section 13A

The determination section 13A in accordance with the present embodiment includes a comparison section 131. The comparison section 131 compares the future state of the vehicle 101A which future state is based on the prediction data $D_2$ with a current state of the vehicle 101A which current state is based on the detection data $D_1$ immediately after acquisition of the detection data $D_1$. The determination section 13A in accordance with the present embodiment compares the prediction data $D_2$ with the detection data $D_1$. The determination section 13A in accordance with the present example embodiment determines, as whether it is possible to transmit usage information, whether an error which is not less than a threshold has occurred between the future state and the current state. Specifically, for example, in a case where the prediction data $D_2$ is a position of the vehicle 101A after 80 msec, and the vehicle 101A travels at 60 km/h, the vehicle 101A travels approximately 1.3 m during 80 msec. In such a case, in a case where a difference between a predicted future position and an actually reached position is less than 1.3 m, it is determined that the difference is an allowable error. In contrast, in a case where the difference is not less than 1.3 m, it is determined that the difference is an unacceptable error. Usage information in accordance with the present embodiment constitutes part of the detection data $D_1$.

Further, as described above, the determination section 13A in accordance with the present example embodiment determines, as whether it is possible to transmit information, whether the error which is not less than the threshold has occurred between the future state and the current state. Thus, in a case where the determination section 13A determines that the error which is not less than the threshold has occurred, the vehicle side communication section 2 in accordance with the present embodiment wirelessly transmits the usage information to the server 102A. This makes it unnecessary, during a period until the predicted future is reached, to transmit data to the server 102A, so that a volume of communication traffic between the vehicle 101A and the server 102A can be reduced. Note that, in a case where the server 102A can directly acquire the detection data $D_1$ from, for example, a road camera C, a road sensor $S_9$, etc., the first transmission control section 14A may control the vehicle side communication section 2 so as to stop transmission of the usage information.

Note that the determination section 13A may be configured to determine, as whether it is possible to transmit the usage information, whether the predicted future is reached.

First Transmission Control Section 14A

The first transmission control section 14A controls the vehicle side communication section 2 on the basis of a determination result from the determination section 13A. With this, in a case where the determination section 13A determines that the error which is not less than the threshold has occurred, the vehicle side communication section 2 wirelessly transmits, to the server 102A, some of new detection data $D_1$ acquired by the acquisition section 11. The first transmission control section 14A in accordance with the present embodiment controls the vehicle side communication section 2 so that the vehicle side communication section 2 wirelessly transmits, to the server 102A, some of a plurality of the detection data $D_1$ as the usage information. This makes it possible to operate another device that operates on the basis of the detection data $D_1$ (for example, the server 102A that carries out future prediction based on the detection data $D_1$). While the determination section 13A is determining that the error which is not less than the threshold has not occurred, the vehicle side prediction section 12A repeatedly outputs the prediction data $D_2$. Note, however, that the first transmission control section 14A does not control the vehicle side communication section 2 so as to transmit the prediction data $D_2$ to the server 102A.

In this case, the first transmission control section 14A may be configured to control the vehicle side communication section 2 so that, while the determination section 13A is determining that an error which has occurred between the future state and the current state is less than the threshold, the vehicle side communication section 2 does not transmit a prediction result for the future state of the vehicle 101A to the server 102A even in a case where the vehicle side prediction section 12A predicts the future state of the vehicle 101A.

Server 102A

The server 102A in accordance with the present embodiment includes not only a server side communication section 6 but also a server side control section 5A and a server side storage section 7 as illustrated in FIG. 8.

Server Side Storage Section 7

The server side storage section 7 stores a trained model 71.

The trained model 71 in accordance with the present embodiment is similar to the trained model 31A stored in the vehicle side storage section 3A.

Server Side Control Section 5A

The server side control section 5A includes not only a second transmission control section 53 but also a second reception control section 51A, an execution section 52A, and a server side prediction section 54.

Second Reception Control Section 51A

The second reception control section 51A in accordance with the present embodiment controls the server side communication section 6 so as to receive, for example, various data and various signals from the vehicle 101A. As described earlier, the vehicle 101A in accordance with the present embodiment transmits some of the detection data $D_1$ as the usage information to the server 102A. Thus, the server side communication section 6 receives some of the plurality of the detection data $D_1$ as the usage information. Further, the second reception control section 51A in accordance with the present embodiment controls the server side communication section 6 so as to receive the detection data $D_1$ from another device (the road camera C, the road sensor $S_9$, etc.).

Server Side Prediction Section 54

The server side prediction section 54 predicts the state of the vehicle 101A in the relatively near future (after the second certain time period from the time at which the detection data $D_1$ is acquired) on the basis of some of the detection data $D_1$, and outputs a prediction result for the state of the vehicle 101A as the prediction data $D_2$. This makes it possible to reduce a burden on the vehicle 101A and make a comparison with the prediction data $D_2$ on the vehicle 101A side. The server side prediction section 54 in accordance with the present embodiment repeats prediction in a cycle identical to the cycle in which the vehicle side prediction section 12A of the vehicle 101A repeats prediction. Further, at a timing at which the detection data $D_1$ is received from the vehicle side prediction section 12A (for the first time and in a case where the error which is not less than the threshold has occurred), the server side prediction section 54 in accordance with the present embodiment carries out prediction by inputting, into the trained model 71, the detection data $D_1$ that has been received from the vehicle 101A. In contrast, at a timing different from the above timing (in a case where the error which is not less than the threshold has not occurred), the server side prediction section 54 carries out prediction by inputting, into the trained model 71, the predictive detection data $D_3$ that is the prediction data $D_2$ which the server side prediction section 54 predicted last time. This allows the server side prediction section 54 to input data into the trained model 71 also at a time different from when the detection data $D_1$ is received from the vehicle 101A, so that the server side prediction section 54 can carry out prediction in synchronization with the vehicle side prediction section 12A.

Execution Section 52A

The execution section 52A carries out a simulation regarding a traffic condition on the basis of the prediction data $D_2$ output by the server side prediction section 54 and data on a traffic participant.

Operation by Digital Twin System 100A

Figure 9:
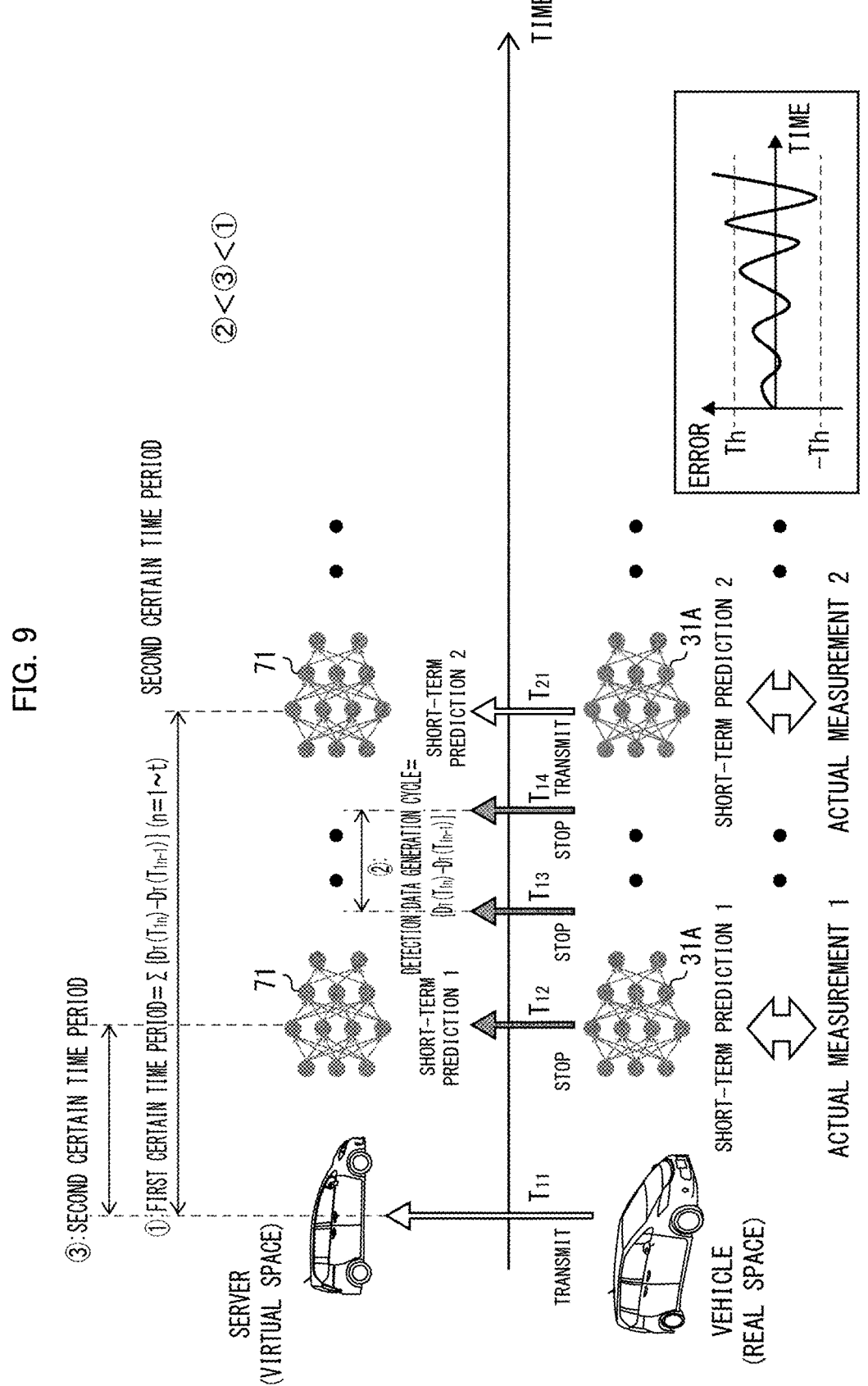
FIG. 9 is a timing diagram illustrating an operation by a digital twin system in accordance with Embodiment 2.

In a case where a certain event occurs in the vehicle 101A constituting the digital twin system 100A, the vehicle side prediction section 12A of the vehicle 101A uses the trained model 31A to output the prediction data $D_2$ as illustrated in FIG. 9. The vehicle 101A immediately transmits, to the server 102A, the detection data $D_1$ that has been used to output the prediction data $D_2$ ($T_{11}$).

Thereafter, the vehicle 101A compares the future state of the vehicle 101A which future state is based on the prediction data $D_2$ with a current state of the vehicle 101A which current state is based on the detection data $D_1$ immediately after acquisition of the detection data $D_1$ ($T_{12}$, $T_{13}$, . . . ). A conventional vehicle repeats communication with the server 102A also during that period ($T_{12}$, $T_{13}$, . . . ), whereas the vehicle 101A transmits no detection data $D_1$ until it is determined that an error $T_h$, $-T_h$ which is not less than a threshold has occurred between the future state and the current state. Further, the vehicle 101A outputs the prediction data $D_2$ in a certain cycle until it is determined that the error $T_h$, $-T_h$ which is not less than the threshold has occurred, and uses the prediction data $D_2$ as the predictive detection data $D_3$ for subsequent prediction.

The server 102A that has received the detection data $D_1$ stops prediction which has been carried out so far with use of the predictive detection data $D_3$, and outputs the prediction data $D_2$ which is based on the received detection data $D_1$. The server 102A carries out a simulation on the basis of the output prediction data $D_2$ and generates a digital twin indicating the future state of the vehicle 101A.

In a case where the error $T_h$, $-T_h$ which is not less than the threshold occurs between the future state and the current state, the vehicle 101A uses the trained model 31A again to output the prediction data $D_2$ indicating the future state of the vehicle 101A. The vehicle 101A immediately transmits, to the server 102A, the detection data $D_1$ that has been used to output the prediction data $D_2$ ($T_{21}$). Thereafter, the vehicle 101A compares the future state of the vehicle 101A with the current state of the vehicle 101A ($T_{22}$, $T_{23}$, ... ). The vehicle 101A transmits no detection data $D_1$ until it is determined that the error $T_h$, $-T_h$ which is not less than the threshold has occurred between the future state and the current state. Further, the vehicle 101A outputs the prediction data $D_2$ in a certain cycle until it is determined that the error $T_h$, $-T_h$ which is not less than the threshold has occurred, and uses the prediction data $D_2$ as the predictive detection data $D_3$ for subsequent prediction.

The server 102A that has received the detection data $D_1$ stops prediction which has been carried out so far with use of the predictive detection data $D_3$, and outputs the prediction data $D_2$ which is based on the received detection data $D_1$. The server 102A carries out a simulation on the basis of the output prediction data $D_2$ and generates a digital twin indicating the future state of the vehicle 101A. Thereafter, the vehicle 101A and the server 102A repeat the operation as described above every time the error $T_h$, $-T_h$ which is not less than the threshold occurs between the future state and the current state. As a result, a conventional vehicle is configured to periodically transmit data as illustrated in the upper part of FIG. 7, whereas the vehicle 101A in accordance with the present embodiment transmits the usage information at longer intervals as compared with the conventional vehicle as illustrated in the lower part of FIG. 7.
Effect According to the vehicle 101A in accordance with the present embodiment described above, some of the detection data $D_1$ is transmitted as the usage information to the server 102A, and the future state of the vehicle 101A is predicted on each of the vehicle 101A side and the server 102A side. Some of data has a data volume that is smaller than a total volume of all the detection data $D_1$. This allows the server 102A to carry out the simulation with a smaller data volume than a conventional server. Further, since the prediction data $D_2$ output by the vehicle 101A and the prediction data $D_2$ output by the server 102A are updated before an error therebetween reaches a value that is not less than a predetermined value, the server 102A can reproduce a digital twin with high accuracy. As a result, in the digital twin system 100A including the vehicle 101A and the server 102A that generates a digital twin of the vehicle 101A, a reduction in volume of communication traffic between the vehicle 101A and the server 102A can be achieved without a decrease in accuracy of the digital twin.

Further, frequent transmission of the detection data $D_1$ as in the prior art results in an increase in volume of communication traffic. However, the vehicle 101A and the server 102A in accordance with the present embodiment reuse, as input, respective outputs (predictive detection data $D_3$) of the prediction sections 12A and 54 during a period until it is determined that the error which is not less than the threshold has occurred between the future state and the current state, and make short-cycle transmission unnecessary by transmitting no detection data $D_1$ during that period. Thus, the vehicle 101A and the server 102A in accordance with the present embodiment make it possible both to prevent or reduce a volume of communication traffic and to achieve highly accurate prediction.

Other Embodiments

All or part of the functions of the control blocks can be realized by a logic circuit. For example, the present invention encompasses, in its scope, an integrated circuit in which a logic circuit that functions as each of the control blocks is formed. Alternatively, the functions of the control blocks can be realized by, for example, a quantum computer.
Software Implementation Example The functions of the vehicles 101 and 101A and the servers 102 and 102A (hereinafter, referred to as "device, etc.") can be realized by a program for causing a computer to function as the device, etc., the program causing the computer to function as the control blocks (in particular, the sections included in the vehicle side control sections 1 and 1A and the server side control sections 5 and 5A) of the device. In this case, the device includes, as hardware for executing the program, a computer that includes at least one control device (e.g., a processor) and at least one storage device (e.g., a memory). The functions described in the foregoing embodiments are realized by executing the program with use of the control device and the storage device. The program may be recorded in one or more non-transitory computer-readable recording media. The one or more recording media may or may not be included in the device. In the latter case, the program may be made available to the device via any wired or wireless transmission medium.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

- 100, 100A Digital twin system
- 101, 101A Vehicle
- 1, 1A Vehicle side control section
- 11 Acquisition section
- 12 Prediction section
- 12A Vehicle side prediction section
- 13, 13A Determination section
- 131 Comparison section
- 14, 14A First transmission control section
- 15 First reception control section
- 16 Output control section
- 2 Vehicle side communication section
- 3 Storage section
- 31, 31A Trained model
- 3A Vehicle side storage section
- 4 Display section
- 102, 102A Server
- 5, 5A Server side control section
- 51, 51A Second reception control section
- 52, 52A Execution section
- 53 Second transmission control section
- 54 Server side prediction section
- 6 Server side communication section
- 7 Server side storage section
- 71 Trained model

The invention claimed is:

1. A system comprising a vehicle and server, the vehicle comprising:

a plurality of types of sensors;

an acquisition section that acquires a plurality of types of detection data from the respective plurality of types of sensors every time a certain time period has elapsed;

a vehicle side prediction section that, every time the plurality of types of detection data are acquired, uses a vehicle side trained model constructed by machine learning to predict a state of the vehicle after a second time period from a time when the detection data is acquired and that outputs a prediction result for the transition of the state of the vehicle as prediction data, wherein the second time period is longer than the certain time period;

a comparison section that, every time the plurality of types of the detection data are acquired, compares a measured value indicating the state of the vehicle which state is based on the detection data with a predicted value of the state of the vehicle, at the time when the detection data is acquired; and a communication section that transmits the detection data to a server which uses the prediction data to predict a future state of the vehicle, wherein in a case where an error which is not less than a threshold set in advance has occurred between the predicted value and the measured value after transmission of the detection data, the communication section transmits, to the server, the detection data corresponding to the measured value, the server comprising a server side prediction section, wherein the server side prediction section is configured to repeat an operation of predicting a state of the vehicle and outputting a prediction result for the state of the vehicle as prediction data, the operation being repeated in a cycle identical to that of the vehicle side prediction section, at a timing at which detection data is received from the vehicle, the server side prediction section carries out prediction by inputting, into a server side trained model constructed by machine learning, a part of the detection data received from the vehicle, and at a timing at which the detection data is not received from the vehicle, the server side prediction section carries out prediction by inputting, into the server side trained model, as the detection data, prediction data which the server side prediction section outputted last time.

2. The system as set forth in claim 1, wherein the vehicle further comprises a determination section that determines whether it is possible to transmit the detection data.

3. The system as set forth in claim 2, wherein, while the determination section is determining that an error which has occurred between the predicted value and the measured value is less than the threshold, the communication section transmits no detection data to the server even in a case where the vehicle side prediction section predicts the transition of the state of the vehicle.

4. The system as set forth in claim 1, wherein the server side prediction section carries out prediction of the future state of the vehicle based on the detection data and traffic data of a traffic participant present around the vehicle.

5. The vehicle as set forth in claim 1, wherein the reception section receives the result of the prediction of the future state of the vehicle from the server, and wherein the vehicle further comprises a display section that displays the received result of the prediction of the future state of the vehicle.

6. The system as set forth in claim 1, wherein at a timing at which the detection data is transmitted to the server, the vehicle side prediction section carries out prediction by inputting, into the vehicle side trained model, a part of the detection data transmitted to the server, and at a timing at which the detection data is not transmitted to the server, the vehicle side prediction section carries out prediction by inputting, into the vehicle side trained model, as the detection data, prediction data which the vehicle side prediction section outputted last time.

7. The system as set forth in claim 1, wherein the detection data include update information which is updated periodically and map information.

* * * * *